Figure 1:
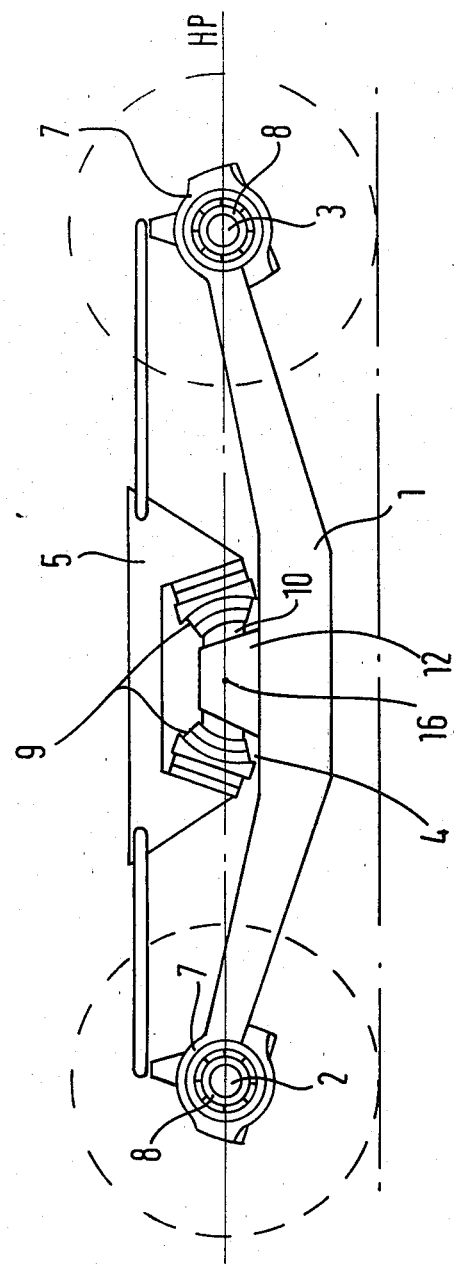

United States Patent [19]

Kenyon

[11] 4,357,032
[45] Nov. 2, 1982

[54] VEHICLE SUSPENSIONS
[75] Inventor: Dennis Kenyon, Evington, England
[73] Assignee: Dunlop Limited, London, England
[21] Appl. No.: 162,917
[22] Filed: Jun. 25, 1980
[30] Foreign Application Priority Data
   Jun. 26, 1979 [GB] United Kingdom ............... 7922270
[51] Int. Cl.³ ............................................ B60G 19/02
[52] U.S. Cl. ................................ 280/681; 267/63 A;
                                                280/687
[58] Field of Search ............... 280/681, 687, 716, 717;
                                                267/63 A

[56]         References Cited
       U.S. PATENT DOCUMENTS

| 2,828,957 | 4/1958  | Hirst    | 267/63 A |
| 2,872,207 | 2/1959  | Hirst    | 280/687  |
| 3,045,998 | 7/1962  | Hirst    | 280/716  |
| 3,301,573 | 1/1967  | Hickman  | 280/681  |
| 3,539,170 | 11/1970 | Hamel    | 267/63 A |
| 3,618,971 | 11/1971 | Wragg    | 280/681  |
| 3,679,197 | 7/1972  | Schmidt  | 267/152  |
| 4,211,429 | 7/1980  | Howard   | 280/716  |

FOREIGN PATENT DOCUMENTS

| 835010  | 5/1960  | United Kingdom . |
| 863869  | 3/1961  | United Kingdom . |
| 967815  | 8/1964  | United Kingdom . |
| 1251328 | 10/1971 | United Kingdom . |

Primary Examiner—Joseph F. Peters, Jr.
Assistant Examiner—John A. Carroll
Attorney, Agent, or Firm—Stevens, Davis, Miller & Mosher

[57]            ABSTRACT

A tandem axle vehicle suspension comprising a beam extending between and pivotally connected at each end to a respective one of a pair of axles and a spring acting between the beam and a vehicle mounting. The spring comprises a pair of springs the axes of which are inclined at equal and opposite angles to the vertical. Each spring comprises layers of elastomeric material interleaved with and bonded to reinforcing elements wherein at least some of the elastomeric layers and elements are curved about a common center of curvature.

11 Claims, 8 Drawing Figures

VEHICLE SUSPENSIONS

This invention concerns improvements in or relating to vehicle suspensions and in particular to tandem axle vehicle suspensions of the kind in which a beam extends between and is pivotally connected at each end to a respective one of a pair of axles and spring means acts between the beam and a vehicle mounting.

In addition to accommodating any vertically applied load the spring means is also required to accommodate pivotal movement of the beam in a pitching sense (fore and aft) resulting, for example, from irregularities in the surface being traversed and also the horizontal forces developed due to braking or driving.

Spring means is known comprising a pair of springs, each comprising a plurality of flat rubber layers interleaved with and bonded to flat metal plates, arranged with their axes inclined equally and oppositely in an upward direction from the beam and with the outermost metal plates secured, for example by bolting, to mounting faces on the beam and vehicle mounting. With this arrangement the rubber layers are loaded in compression and shear under vertically applied loads and pivotal movement of the beam is accommodated by rotation of one mounting face relative to the other. This relative rotation between the mounting faces causes additional compression strains on some parts of the springs and less on others which introduces a very severe fatigue condition in the springs with consequent reduction in spring life.

In order to overcome this problem it has already been proposed for example in U.K. Pat. Nos. 967,815 and 1,276,352 to replace the fixed rigid mounting of the spring means to the beam with a pivotal mounting, ideally positioned with its axis of rotation coincident with the intersection of the resultant forces of the springs when under load, so as to accommodate pitch oscillations of the beam (fore and aft) and thereby improve the fatigue life of the springs.

A disadvantage of such pivotal mounting is that the mounting components have to be relatively large and robust to withstand the heavy loadings which not only complicates the design of the suspension but also increases the weight and cost.

The invention as claimed is intended to remedy the aforementioned drawbacks of the known suspensions. It solves the problem of how to design a suspension using a fixed attachment of the spring means to the beam which will accommodate pivotal movement of the beam without introducing a severe fatigue condition in the springs by utilizing a construction in which each spring comprises layers of elastomeric material interleaved with and bonded to reinforcing elements in which at least some of the elastomeric layers and elements are curved about a common centre of curvature thereby providing a similar function to the pivotal mounting used in the prior art suspensions.

The advantages offered by the invention are mainly that the attachment of the springs to the beam is considerably simplified avoiding the use of pivotal mounting components which are subject to wear and require periodic replacement to avoid premature suspension failure. Also the weight and cost of the suspension are reduced.

Each spring may be formed in two sections, one section comprising said curved elastomeric layers and reinforcing elements and the other section comprising elastomeric layers and reinforcing elements having an alternative configuration, for example flat or chevron shaped. Preferably the curved section of each spring is bonded to an end plate for attachment by conventional means, for example by bolting, clamping or welding to a mounting fixed to the beam and the other section is likewise bonded to an end plate for similar attachment to the vehicle mounting.

In an alternative spring construction all the elastomeric layers and reinforcing elements are curved.

Curved elastomeric layers may be of uniform thickness or more preferably the layer thickness increases in proportion to the distance from said centre of curvature.

Preferably the centre of curvature of the springs coincide with the effective spring centre of the spring means.

The effective spring centre of the spring means and the beam pivot axes are preferably arranged to lie in a common horizontal plane for a predetermined load condition, generally semi-laden or fully laden. Preferably the axle centres also lie in said common horizontal plane, for example the beam may be provided with a respective annular bearing at each end in which the associated axle or an axle housing is received to allow pivotal movement of the beam relative to the axles.

Preferably the elastomeric material comprises rubber and the reinforcing elements comprises rigid metal plates.

Figure 2:
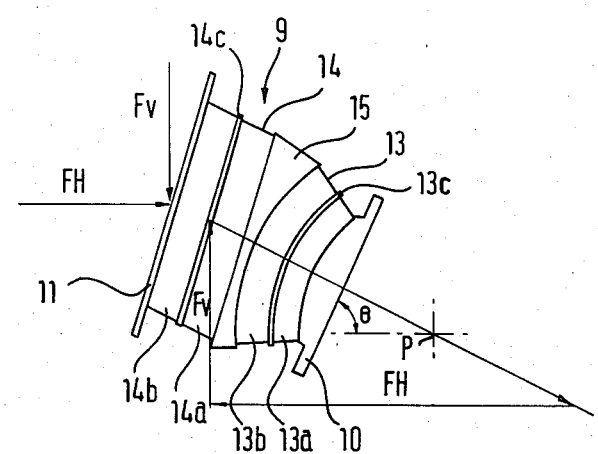
Figure 3:
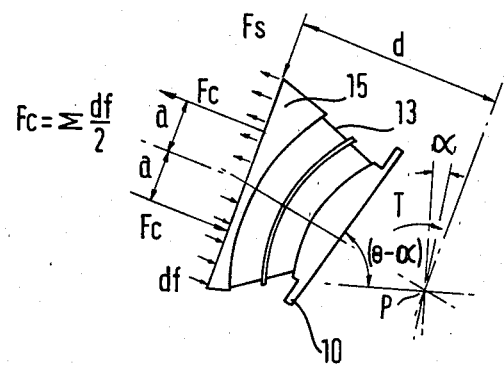
Figure 4:
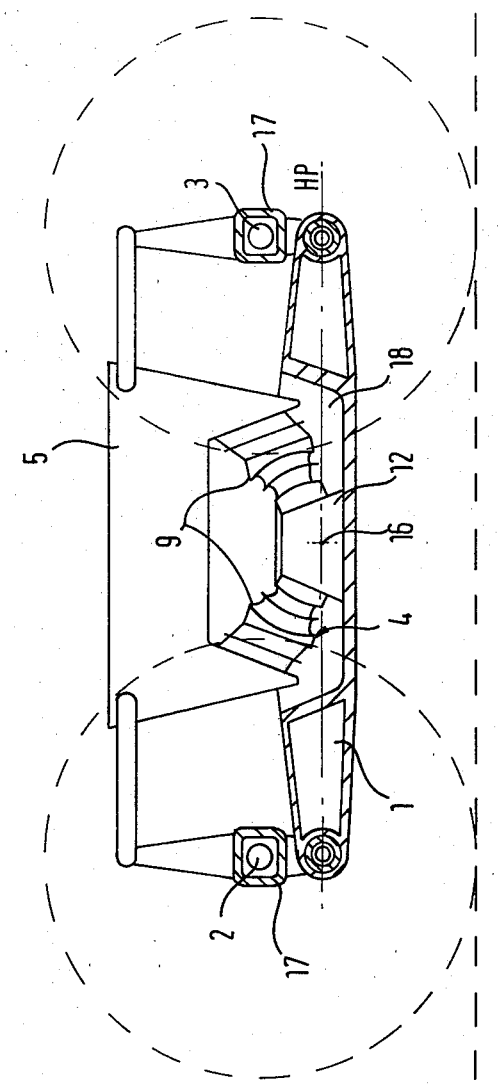
Figure 5:
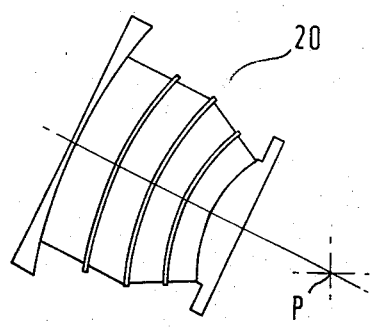
Figure 6:
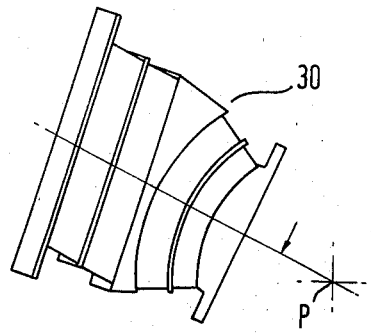
Figure 7:
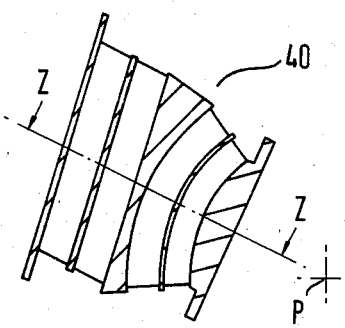
Figure 8:
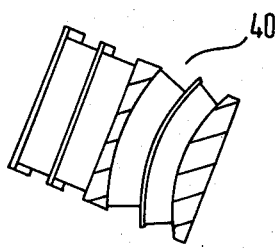

The invention will now be described in more detail by way of example only with reference to the accompanying drawings wherein:

FIG. 1 is a side elevation of a first embodiment of suspension according to the present invention, FIG. 2 is a side elevation, to an enlarged scale of one of the springs shown in FIG. 1 in an undeformed condition, FIG. 3 is a side elevation of part of the spring shown in FIG. 2 showing the deformation of the curved section due to pivotal movement of the beam, FIG. 4 is a side elevation of a second embodiment of suspension according to the present invention, FIGS. 5 and 6 are side elevations of alternative spring constructions, FIG. 7 is a cross-section of a further spring construction, and FIG. 8 is a section on the line Z—Z of FIG. 7.

The tandem axle vehicle suspensions shown in FIGS. 1 and 4 of the accompanying drawings each comprise a beam 1 extending in the longitudinal direction of the vehicle between corresponding ends of a pair of axles 2,3 and spring means 4 acting between the beam 1 and a mounting 5 on the vehicle frame. A similar suspension system extends between the corresponding other ends of the axles and the vehicle frame.

Referring to FIG. 1, the beam 1 is provided at each end with a respective annular split bearing 7 in which an axle casing 8 is located to allow pivotal movement of the beam relative to the axles.

The spring means 4 comprises two springs 9 inclined equally and oppositely in an upward direction from the beam 1, i.e. in a V-formation. The springs 9 are similar and comprise layers of rubber interleaved with and bonded to rigid metal plates. The outer rubber layers of each spring are bonded to end plates 10 and 11 which are attached to an upstanding support 12 on the beam and the mounting 5 respectively by bolting, clamping or welding.

As shown in FIG. 2 each spring is formed in two sections 13,14 separated by a metal plate 15. One section 13 comprises two curved layers 13a, 13b, the layer 13b being thicker than the layer 13a, interleaved with and bonded to a curved metal plate 13c. The layers 13a, 13b and the plate 13c are curved about a common centre of curvature P. The other section 14 comprises two flat rubber layers 14a, 14b interleaved with and bonded to a flat metal plate 14c. The metal plate 15 separating the spring sections has a concave surface to which the layer 13b is bonded and a flat surface to which the layer 13a is bonded. The end plate 10 has a convex surface to which the layer 13a is bonded and the end plate 11 has a flat surface to which the layer 14b is bonded.

FIG. 3 shows the effect on one of the springs 9 of rotating the end plate 10 secured to the beam support 12 through an axle a, for example as would occur when one only of the axles of the suspension shown in FIG. 1 rides over a bump. The end plate rotates about an axis extending transverse to the direction of compression loading of the spring through the centre of curvature P of the curved spring section 13 and deflects the curved section 13 along its direction of least shear stiffness. The induced torque on the plate 15 separating the curved and flat sections 13 and 14 respectively of the spring is balanced by the sum of the moments of the change in force acting on the surface bonded to the flat section 14. The ratio of compression stiffness in the section 14 to the shear stiffness in section 13 will always be large, therefore a small compression deflection in section 14 will produce a large change in force and consequently a large balancing moment. As a result the plate 15 does not rotate by any significant amount relative to the centre of curvature P and the compression strain in the flat section 14 is not increased by any significant amount. Simultaneously the curved section of the other spring 9 will undergo an equal and opposite deflection due to rotation of the associated end plate 10 secured to the beam support 12.

It will be apparent from the foregoing that the curved section of the springs 9 provides a similar function to the pivotal mounting of the spring means in the prior art suspensions, i.e. pitch oscillations (fore and aft) of the beam are accommodated without substantially decreasing the fatigue life of the springs, without the aforementioned problems and disadvantages of providing such pivotal mounting.

As shown in FIG. 1 the beam pivot axes and axle centres lie on a common horizontal plane HP. The centres of curvature of the springs 9 coincide with the effective spring centre 16 of the spring means which also lies in the aforementioned plane HP for a predetermined load condition. As a result of this arrangement the vertical component of the brake reaction is reduced and both axles maintain near equality of vertical loading thus increasing the braking performance as compared with more conventional arrangements in which the pivot axes of the beam lie below the axle centres with the springs occupying the same relative position i.e. the effective spring centre and beam pivot axes do not lie in a common horizontal plane.

Referring to FIG. 4, the suspension shown differs from that shown and described with reference to FIG. 1 in that the axle casings 17 have a substantially square cross-section and the beam ends are pivoted below the axle centre. In this construction the beam 1 is formed with a central recess 18 in which the spring means 4 is located so that the effective spring centre 16 lies in the common horizontal plane HP through the beam pivot axes thereby maintaining the improved braking performance.

The invention is not restricted to the above-described embodiments which can be modified in a number of ways, for example FIG. 5 shows an alternative construction of spring 20 in which all the rubber layers (20a, b, c, d,) and interleaving metal plates (20e, f, g,) are curved about a common centre of curvature P and the thickness of the rubber layers increases proportionally to the distance of the layers from the centre of curvature.

FIG. 6 shows a further construction of spring 30 comprising a curved section 31 similar to the curved section 13 of the above-described spring and a section 32 comprising two rubber layers (32a, 32b) and interleaving metal plate (32c) of chevron shape to increase the lateral stiffness of the spring and thereby increase the roll stiffness of the suspension.

FIGS. 7 and 8 show yet another construction of spring 40 comprising a curved section (41) and a flat section (42) in which the curved rubber layers (41a, 41b) and metal plate (41c) are part-spherical to increase the stability of the spring and permit rotation of the support 12 in all three planes coincident with the centre of curvature P.

Having now described my invention—what I claim is:

1. A tandem axle vehicle suspension comprising a beam extending between and pivotally connected at each of its ends to a respective one of a pair of axles, spring means acting between a central portion of said beam and a vehicle mounting, said spring means comprising a pair of springs the axes of which are inclined at equal and opposite angles to the vertical, each spring being rigidly mounted to an inclined surface on the central portion of said beam and to said vehicle mounting so that pivotal movement of the beam in relation to the vehicle takes place in the spring itself, each said spring comprising layers of elastomeric material interleaved with and bonded to reinforcing elements of which at least some of said elastomeric layers and elements of each spring are curved about a common centre of curvature and the elastomeric layers and elements of each spring lie in planes extending substantially parallel to said axles.

2. A suspension as claimed in claim 1 wherein each spring is formed in two sections, one section comprising said curved elastomeric layers and reinforcing elements and the other section comprising elastomeric layers and reinforcing elements having an alternative configuration.

3. A suspension as claimed in claim 1 wherein all said elastomeric layers and reinforcement elements of each spring are curved about said common centre of curvature.

4. A suspension as claimed in claim 1 wherein the thickness of said curved elastomeric layers of each spring increases in proportion to the distance of said layer from said common centre of curvature.

5. A suspension as claimed in claim 1 wherein said common centre of curvature coincides with the effective spring centre of said spring means.

6. A suspension as claimed in claim 1 wherein the effective spring centre of said spring means and the beam pivot axes are arranged to lie in a common horizontal plane for a predetermined load condition.

7. A suspension according to claim 6 wherein the axle centres lie in said common horizontal plane.

8. A suspension according to claim 7 wherein said beam is provided with a respective annular bearing at each end in which said associated axle is received.

9. A suspension according to claim 7 wherein said beam is provided with a respective annular bearing at each end in which an axle housing is received.

10. A suspension according to claim 1 wherein said elastomeric material comprises rubber and said reinforcing elements comprise rigid metal plates.

11. A tandem axle vehicle suspension comprising a beam extending between and pivotally connected at each end to a respective one of a pair of axles, spring means acting between a central portion of said beam and a vehicle mounting, said spring means comprising a pair of springs the axes of which are inclined at equal and opposite angles to the vertical, each spring being rigidly mounted to an inclined surface on the central portion of said beam and to said vehicle mounting so that pivotal movement of the beam in relation to the vehicle takes place in the spring itself, each said spring comprising layers of elastomeric material interleaved with and bonded to reinforcing elements of which at least some of said elastomeric layers and elements of each spring are curved about a common centre of curvature and the curved elastomeric layers and elements of each spring are pivotal about an axis parallel to the axles.

* * * * *